(12) United States Patent
Kageyama et al.

(10) Patent No.: US 11,503,216 B2
(45) Date of Patent: Nov. 15, 2022

(54) IMAGE CAPTURING APPARATUS, METHOD OF CONTROLLING THE SAME, AND STORAGE MEDIUM FOR CONTROLLING EXPOSURE

(71) Applicant: CANON KABUSHIKI KAISHA, Tokyo (JP)

(72) Inventors: Takashi Kageyama, Yokosuka (JP); Hiroki Saegusa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 16/842,179

(22) Filed: Apr. 7, 2020

(65) Prior Publication Data

US 2020/0336643 A1    Oct. 22, 2020

(30) Foreign Application Priority Data

Apr. 22, 2019   (JP) .............................. JP2019-081313
Feb. 12, 2020   (JP) .............................. JP2020-021880

(51) Int. Cl.
*H04N 5/235* (2006.01)
*G02B 7/02* (2021.01)
(Continued)

(52) U.S. Cl.
CPC ............ *H04N 5/2351* (2013.01); *G02B 7/02* (2013.01); *G03B 7/16* (2013.01); *G03B 15/03* (2013.01);
(Continued)

(58) Field of Classification Search
CPC .. H04N 5/2351; H04N 5/2352; H04N 5/2353; H04N 5/2354; G02B 7/02; G02B 7/16; G03B 15/03; G03B 7/097
See application file for complete search history.

(56) References Cited

U.S. PATENT DOCUMENTS 6,215,961 B1    4/2001   Mukai et al.
6,693,673 B1    2/2004   Tanaka et al.
(Continued)

FOREIGN PATENT DOCUMENTS

CN    1497318 A       5/2004
CN    102188232 A     9/2011
(Continued)

OTHER PUBLICATIONS

Xin Qi, Auxiliary function of exposure compensation, Photographic Machinery Institute, Mar. 2017, pp. 32-36, China Academic Journal Electronic Publishing House, www.cnki.net.
(Continued)

*Primary Examiner* — Nicholas G Giles
(74) *Attorney, Agent, or Firm* — Carter, DeLuca & Farrell LLP

(57) ABSTRACT

An image capturing apparatus, comprises an instructing unit capable of issuing an instruction for an image capture preparation operation and an instruction for an image capture operation, a metering unit configured to meter brightness of a subject, a calculating unit configured to calculate values of exposure parameters based on a metering result, an acquiring unit configured to acquire information related to an image capture lens; and a controlling unit configured to, when image capture is performed with light emitted by a light emitter, control the calculating unit so as to make different a calculation method for the values of the exposure parameters at the time of issuance of the instruction for the image capture preparation operation based on the information related to the image capture lens.

22 Claims, 9 Drawing Sheets

(51) Int. Cl.
*G03B 7/16* (2021.01)
*G03B 15/03* (2021.01)
*G03B 7/097* (2021.01)

(52) U.S. Cl.
CPC ......... *H04N 5/2352* (2013.01); *H04N 5/2353* (2013.01); *H04N 5/2354* (2013.01); *G03B 7/097* (2013.01)

(56) References Cited

U.S. PATENT DOCUMENTS

| | | | |
|---|---|---|---|
| 2002/0164161 A1* | 11/2002 | Yamaguchi | G03B 15/02 396/61 |
| 2007/0274698 A1 | 11/2007 | Nose | |
| 2009/0009649 A1* | 1/2009 | Okamoto | H04N 5/2351 348/340 |
| 2019/0149706 A1* | 5/2019 | Rivard | H04N 5/2354 348/371 |

FOREIGN PATENT DOCUMENTS

| | | |
|---|---|---|
| CN | 102469265 A | 5/2012 |
| CN | 107846556 A | 3/2018 |
| CN | 108270966 A | 7/2018 |
| JP | 2002333649 A | 11/2002 |
| JP | 2007243714 A | 9/2007 |
| JP | 2009217188 A | 9/2009 |

OTHER PUBLICATIONS

Notification of the First Office Action issued by the China National Intellectual Property Administration on Dec. 3, 2021 in corresponding CN Patent Application No. 202010320646.3, with English translation.

Notification of the Second Office Action issued by the China National Intellectual Property Administration dated May 11, 2022 in corresponding CN Patent Application No. 202010320646.3, with English translation.

* cited by examiner

IMAGE CAPTURING APPARATUS, METHOD OF CONTROLLING THE SAME, AND STORAGE MEDIUM FOR CONTROLLING EXPOSURE

BACKGROUND OF THE INVENTION

Field of the Invention

The present invention relates to a technique to control exposure when image capture is performed using a flash on an image capturing apparatus.

Description of the Related Art

Many digital cameras have a flash image capture function in which image capture is performed using coordinated light emission of a flash. A flash has a minimum light amount to which light emission control can be applied, and cannot emit light of a light amount smaller than this minimum light amount. Therefore, when image capture is performed using a flash in a state where a bright f-number and a sensitivity corresponding to a high ISO speed have been set, an image may become brighter than appropriate luminance, that is to say, overexposed. In order to prevent this phenomenon, pre-light emission that is intended to apply light control to a main light emission amount is performed before a flash performs main light emission, and an ISO speed is lowered or a diaphragm is narrowed by an amount corresponding to overexposure that occurs with the minimum light emission based on the brightness of a subject under the pre-light emission; in this way, overexposure is prevented. This method is referred to as, for example, "safety FE".

This safety FE has a problem that exposure parameters (an f-number, an ISO speed, and a shutter speed) that are presented to a user at the time of halfway pressing of a shutter button (at the time of issuance of an instruction for an image capture preparation operation) are different from exposure parameters that are used in actual image capture.

If a limit of an exposure parameter is restricted (the upper limit value of the ISO speed or the minimum value of the f-number is restricted) using in-focus distance information obtained from a lens focal length and a position of a focusing lens, the user can be presented with exposure parameters for image capture using a flash that do not cause overexposure at the time of halfway pressing of the shutter button. Japanese Patent Laid-Open No. 2007-243714 discloses a technique to set a sensitivity based on a zoom/in-focus position.

However, in order to determine exposure parameters based on the in-focus distance information, the in-focus distance information need to have reliable values. An in-focus distance is obtained from a focal length and a position of a focusing lens, within a lens that is removable from and attachable to a digital camera, with reference to distance conversion data that is held as design values. No problem arises as long as this distance conversion data is accurate; however, when the distance information has poor resolution or when design precision is not sufficiently high, it is inappropriate to determine exposure parameters based on the in-focus distance information as a digital camera system.

SUMMARY OF THE INVENTION

The present invention has been made in view of the aforementioned problem, and notifies a user of exposure parameters that render a subject appropriate in performing image capture using a flash.

According to a first aspect of the present invention, there is provided an image capturing apparatus, comprising: at least one processor or circuit configured to function as: an instructing unit capable of issuing an instruction for an image capture preparation operation and an instruction for an image capture operation; a metering unit configured to meter brightness of a subject; a calculating unit configured to calculate values of exposure parameters for the time of image capture based on a metering result of the metering unit; an acquiring unit configured to acquire information related to an image capture lens; and a controlling unit configured to, when image capture is performed with light emitted by a light emitter that illuminates the subject, control the calculating unit so as to make different a calculation method for the values of the exposure parameters at the time of issuance of the instruction for the image capture preparation operation by the instructing unit based on the information related to the image capture lens.

According to a second aspect of the present invention, there is provided a method of controlling an image capturing apparatus that includes at least one processor or circuit configured to function as an instructing unit capable of issuing an instruction for an image capture preparation operation and an instruction for an image capture operation, the method comprising: metering brightness of a subject; calculating values of exposure parameters for the time of image capture based on a metering result of the metering; acquiring information related to an image capture lens; and when image capture is performed with light emitted by a light emitter that illuminates the subject, controlling the calculating so as to make different a calculation method for the values of the exposure parameters at the time of issuance of the instruction for the image capture preparation operation by the instructing unit based on the information related to the image capture lens.

Further features of the present invention will become apparent from the following description of exemplary embodiments with reference to the attached drawings.

DESCRIPTION OF THE EMBODIMENTS

Figure 1:
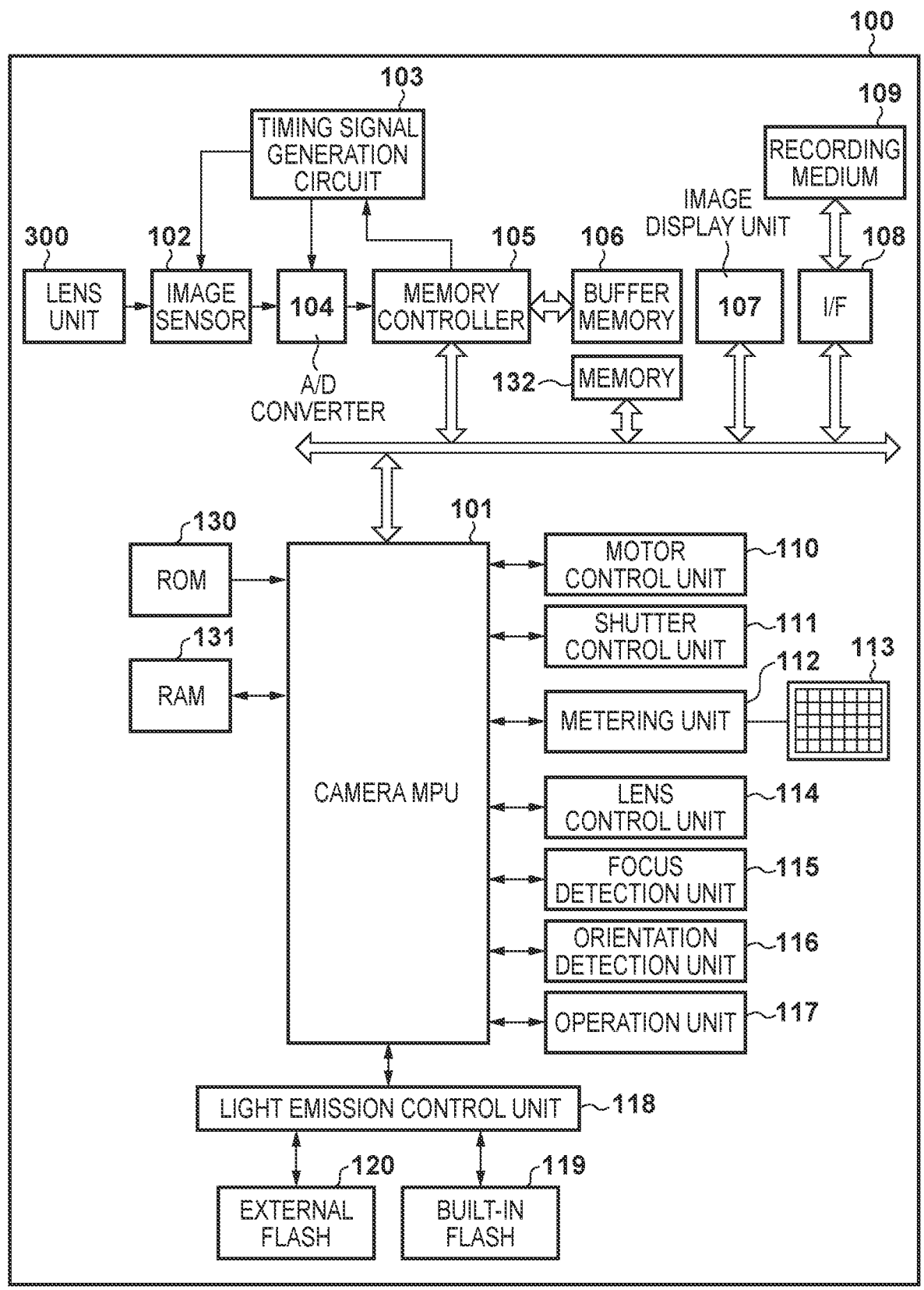
FIG. 1 is a block diagram showing a configuration of a digital camera serving as a first embodiment of an image capturing apparatus of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a configuration of a digital camera 100 (hereinafter referred to as a camera 100) serving as a first embodiment of an image capturing apparatus of the present invention.

A camera MPU 101 is a microcomputer for controlling the overall operations of the camera 100. The camera MPU 101 controls the entirety of the camera 100 by executing control programs that are stored in a ROM 130 in advance. Information of known design parameters and the like is also held in the ROM 130 in advance. A RAM 131 is used to deploy the control programs stored in the ROM 130, and to temporarily store various types of data and parameters that are necessary for the execution of the control programs.

A lens unit (image capture lens) 300 includes an optical system for forming an image of incident light beams on an image sensor 102, and has a diaphragm adjustment mechanism and a focus adjustment mechanism. The image sensor 102 is an image sensor, such as a CCD or a CMOS sensor, that converts reflected light from a subject into an electrical signal. A timing signal generation circuit 103 generates a timing signal that is necessary for causing the image sensor 102 to operate. An A/D converter 104 converts an analog image signal that has been read out from the image sensor 102 into digital image data. A memory controller 105 controls, for example, reading and writing of a memory 132 and a refreshing operation of a buffer memory 106. An image display unit 107 displays image data stored in the buffer memory 106, and also displays numerical values of the current image capture mode and exposure parameters, icons indicating various types of setting states, and the like in the form of superimposition over the image data.

An interface 108 is an interface for connection to a recording medium 109, such as a memory card and a hard disk, and a non-illustrated wireless communication unit. A motor control unit 110 controls a non-illustrated motor in accordance with a signal from the camera MPU 101 so as to bring up/down a non-illustrated mirror for the purpose of changing an optical path of light beams incident via the lens unit 300. When the mirror is up, the light beams incident via the lens unit 300 are directed to the image sensor 102 and the like, whereas when the mirror is down, the light beams incident via the lens unit 300 are directed to a metering sensor 113 and the like.

In accordance with a signal from the camera MPU 101, a shutter control unit 111 controls a non-illustrated shutter that is disposed in front of the image sensor 102 and switches the image sensor 102 between a light-shielded state and an exposed state.

Based on an output of the metering sensor 113 in which the inside of an image capture screen is divided into a plurality of areas, a metering unit 112 outputs metering values, which are the metering results of the respective areas, to the camera MPU 101. Based on the metering values of the respective areas, the camera MPU 101 performs exposure computation for determining, for example, an AV (f-number), a TV (shutter speed), and an ISO (image capture sensitivity), which are exposure parameters for the time of image capture. Furthermore, the camera MPU 101 also computes a light emission amount of a built-in flash 119 (light emitter) or an external flash 120 (light emitter), which illuminates a subject, for the time of image capture with light emission based on metering values that are output from the metering unit 112 when the built-in flash 119 or the external flash 120 have performed preliminary light emission (pre-light emission) with respect to the subject.

A lens control unit 114 makes a focus adjustment and a diaphragm adjustment for the lens unit 300 by controlling a non-illustrated lens driving motor and diaphragm driving motor in accordance with a signal from the camera MPU 101. The lens control unit 114 also acquires lens information from the lens unit 300 in accordance with a signal from the camera MPU 101.

Based on an output of a focus detection sensor that includes a plurality of focus detection regions inside an image capture screen, a focus detection unit 115 outputs defocus amounts of the respective focus detection regions to the camera MPU 101. The camera MPU 101 instructs the lens control unit 114 to execute a focus adjustment operation based on the defocus amounts output from the focus detection unit 115.

An orientation detection unit 116 is composed of, for example, an acceleration sensor, and detects an orientation of the camera 100 based on the direction of gravity.

An operation unit 117 includes a release button that accepts starting instructions for an image capture preparation operation and an image capture operation. When a switch SW1 is turned ON by a first stroke (halfway pressing) of the release button, the camera MPU 101 causes the image capture preparation operation, such as a focus detection operation and a metering operation, to be started. On the other hand, when a switch SW2 is turned ON by a second stroke (full pressing) of the release button, the camera MPU 101 causes the image capture operation to be started. Note that when the switch SW1 has changed from the ON state to the OFF state, the camera MPU 101 measures a period that has elapsed since the switch SW1 entered the OFF state using a timer that is provided internally. Also, the operation unit 117 includes an automatic irradiation angle determination switch that switches between execution and non-execution of a function of automatically determining the optimal irradiation direction in image capture with bounce lighting.

In using the built-in flash 119, a light emission control unit 118 controls light emission patterns of pre-light emission (preliminary light emission), main light emission, and the like and controls a light emission amount in accordance with a signal from the camera MPU 101. The light emission control unit 118 also performs switching control in which one of the built-in flash 119 and the external flash 120 is determined as a target of control corresponding to a signal from the camera MPU 101. Furthermore, the light emission control unit 118 exchanges information with the external flash 120 via communication.

Figure 2:
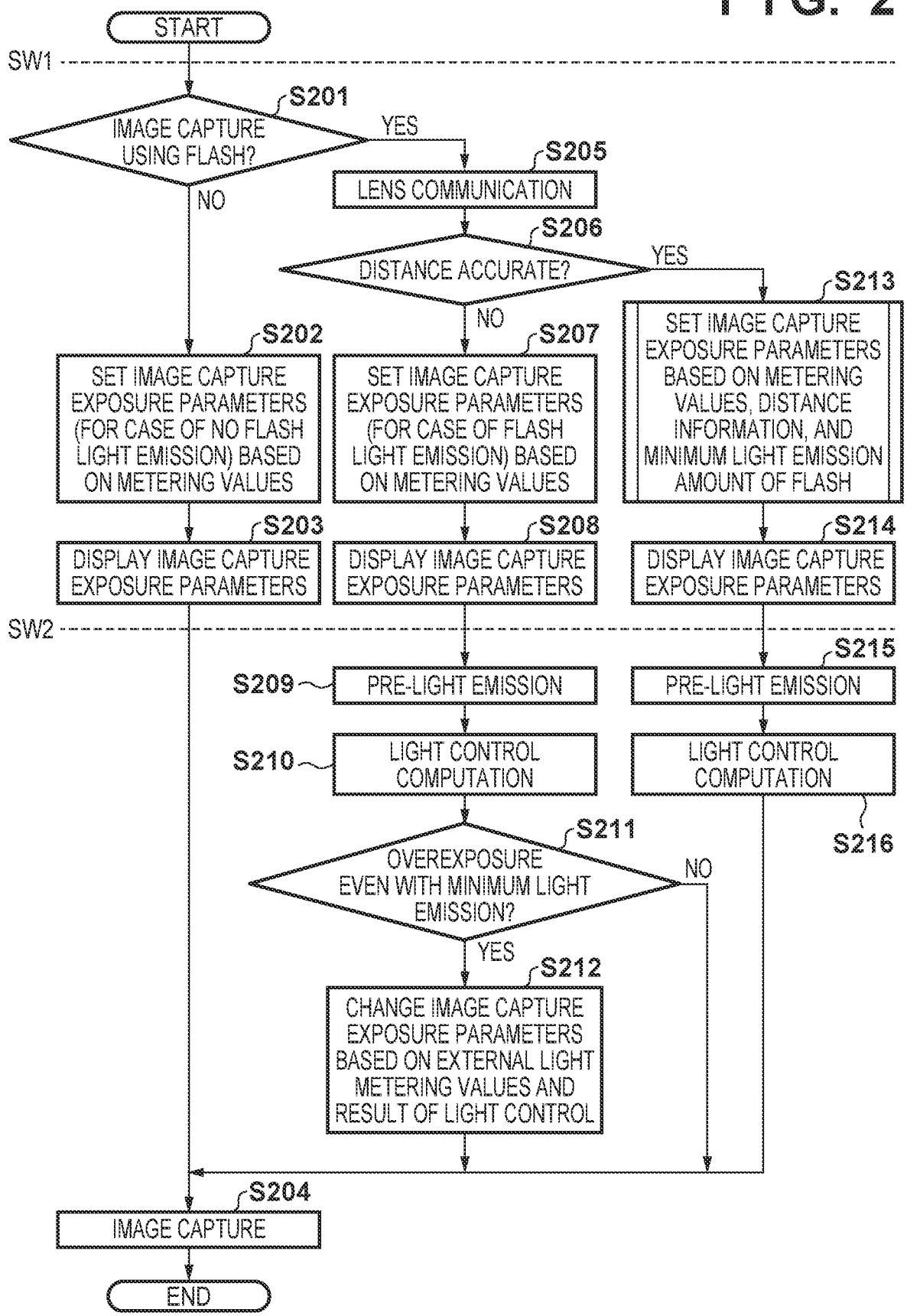
FIG. 2 is a flowchart showing an operation to determine exposure parameters for the time of still image capture on the digital camera in the first embodiment.

Next, FIG. 2 is a flowchart showing an operation to determine exposure parameters for the time of still image capture on the camera 100 in the present embodiment.

In step S201, when the camera MPU 101 has accepted an input that turns ON the switch SW1 via a user's operation on the operation unit 117, whether the settings are configured to perform image capture using the built-in flash 119 or the external flash 120 is determined. Furthermore, whether they are in a state where they can emit light is also determined.

When the settings are configured to perform image capture with no light emission without using the built-in flash 119 or the external flash 120 in step S201, processing proceeds to step S202. In step S202, the camera MPU 101 determines image capture exposure parameters (AV, TV, ISO, etc.) based on the results of metering in the metering unit 112. At this time, a so-called program diagram is used with which the results of metering in the metering unit 112 are used as an input and the image capture exposure parameters are used as an output. In step S202, a program diagram for the case of no flash light emission is used. In step S203, when the user's input that turns ON the switch SW1 of the operation unit 117 has been maintained, the camera MPU 101 displays the image capture exposure parameters that were determined in step S202 on the image display unit 107. When the user has performed an operation to turn ON the switch SW2 of the operation unit 117, processing proceeds to step S204. When the user's operation on the operation unit 117 is an operation to press the switch SW1 and the switch SW2 at a time, the display in step S203 may be omitted. In step S204, a still image capture operation is performed, and the camera MPU 101 transfers image data that has been read out from the image sensor 102 to each unit of a non-illustrated development processing system, develops the image data, and transfers the image data to the recording medium 109 or the wireless communication unit via the interface 108.

In the case of image capture with light emission using the built-in flash 119 or the external flash 120 in step S201, processing proceeds to step S205. Here, a flash that is used in the present image capture is referred to as a "light emission flash". In step S205, the camera MPU 101 acquires lens information from the lens unit 300 via the lens control unit 114.

In step S206, the camera MPU 101 determines whether "information of a distance to an in-focus position" (information of a distance to a subject) included in the lens information acquired in step S205 is accurate. Whether the "information of the distance to the in-focus position" is accurate is determined using "distance information accuracy information" included in the lens information acquired in step S205, or using coincidence between a lens ID group in the ROM 130 that is referred to by the camera MPU 101 and a lens ID included in the lens information.

Note that the information of the distance to the subject may be distance information that has been obtained based on a criterion that is different from that of the information of the distance to the in-focus position. For example, it is permissible to adopt a configuration in which, based on a phase difference sensor provided with phase difference pixels (including an image sensor provided with phase difference pixels on an image capture plane), defocus amounts of the subject acquired by this phase difference sensor are converted into the information of the distance to the subject. In addition, the information of the distance to the subject may be obtained using any method as long as a common criterion is set for the information throughout the entire camera system.

If the determination indicates "inaccurate distance information" in step S206, processing proceeds to step S207. In step S207, image capture exposure parameters (AV, TV, ISO, etc.) are determined, similarly to step S202. At this time, a program diagram for the case of flash light emission is used. In step S208, the exposure parameters that were determined in step S207 are displayed on the image display unit 107, similarly to step S203. When the user has performed an operation to turn ON the switch SW2 of the operation unit 117, processing proceeds to step S209. When the user's operation on the operation unit 117 is an operation to press the switch SW1 and the switch SW2 at a time, the display in step S208 may be omitted.

In step S209, the MPU 101 causes the light emission flash to emit light of a predetermined pre-light emission amount and exposes the image sensor 102 to light at the same time, and also measures a degree of influence of pre-light emission on the subject through metering in the metering unit 112. In step S210, based on the measurement result of step S209, calculation is performed to determine how much light emission is to be used as a main light emission amount for the time of still image capture. If the main light emission amount obtained in step S210 is smaller than the minimum light emission amount of the light emission flash, performing the still image capture using the exposure parameters as-is will produce an image that is brighter than desired brightness obtained by the MPU 101 (overexposure), even if the light emission flash emits light of the minimum light emission amount.

In step S211, whether the main light emission amount obtained in step S210 is smaller than the minimum light emission amount of the light emission flash is determined. Regarding the minimum light emission amount of the light emission flash, the minimum light emission amount of the built-in flash 119 is held in the ROM 130 that is referred to by the MPU 101, whereas the minimum light emission amount of the external flash 120 can be acquired by communication via the light emission control unit 118.

If it is determined in step S211 that the main light emission amount obtained in step S210 is smaller than the minimum light emission amount of the light emission flash, processing proceeds to step S212. In step S212, as an amount by which the main light emission amount obtained in step S210 falls below the minimum light emission amount of the light emission flash causes overexposure, computation is performed to prevent overexposed image capture through reflection into the exposure parameters. The MPU 101 prevents overexposure by narrowing a diaphragm or lowering the ISO speed (including the adjustments of analog gain, digital gain, and a gamma curve).

At this time, an amount of change in the diaphragm or the ISO speed is adjusted so that a region aiming for appropriate light control (a main subject region) can achieve appropriate luminance using the minimum light emission amount of the light emission flash in consideration of reduction in an amount of received external light caused by narrowing of the diaphragm or lowering of the ISO speed. It is plausible to perform exposure compensation by increasing a shutter speed in order to prevent a background region other than the main subject region from becoming dark due to the reduction in the amount of received external light caused by narrowing of the diaphragm or lowering of the ISO speed. However, this is performed based on the settings of an image capture mode and the user settings because performing image capture at a shutter speed longer than the exposure parameters that are displayed in step S208 upon turning ON the switch SW1 may bring disadvantages to the user.

Then, in step S204, the light emission flash emits light and the image sensor 102 is exposed to light at the same time, and a still image is captured. Due to the operation in step S212, information of image capture exposure parameters that is added to the image captured in step S204 may differ from the image capture exposure parameters displayed in step S208. Therefore, in displaying the image capture exposure parameters in step S208, exposure parameters that have a possibility of being changed before step S204 may be displayed using a notation indicating an undetermined value, such as "Auto".

If the determination indicates "accurate distance information" in step S206, processing proceeds to step S213. In step S213, image capture exposure parameters (AV, TV, ISO, etc.) are determined; this operation to determine the image capture exposure parameters will be described using a flowchart of FIG. 3.

Figure 3:
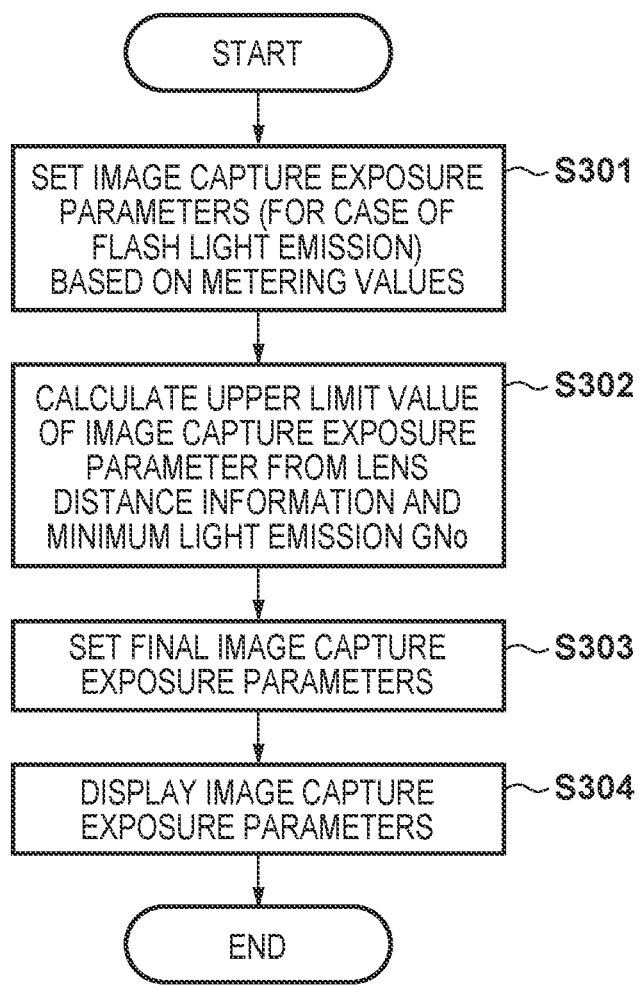
FIG. 3 is a flowchart showing an operation to determine image capture exposure parameters in step S213 of FIG. 2.

FIG. 3 is a flowchart showing the operation to determine the image capture exposure parameters in step S213 of FIG. 2.

First, in step S301, the image capture exposure parameters (AV, TV, ISO, etc.) are determined, similarly to steps S202, S207. At this time, while a program diagram for the case of flash light emission is used, it is assumed that an upper limit value of the ISO speed for the case of ISO Auto setting is set to be higher than that of the program diagram used in step S207. Next, in step S302, a limit value of the ISO speed is calculated from the "information of the distance to the in-focus position" (information of the distance to the subject) included in the lens information acquired in step S205 and the minimum light emission amount of the light emission flash (a value indicating the minimum light emission amount using a guide number).

$$\text{Guide number} = f\text{-number} \times \text{distance } (m) \text{ (note: in the case of ISO 100)} \quad (1)$$

Expression (1) is a basic expression indicating a relationship among a guide number, an image capture exposure parameter, and a distance. By using the "guide number" corresponding to the minimum light emission amount and the "information of the distance to the in-focus position" in this expression, limit values of the f-number and the ISO speed that do not cause overexposure with the guide number corresponding to the minimum light emission amount can be obtained.

In step S302, in the case of ISO Auto setting, a limit value of the ISO speed is obtained by assigning an f-number based on the AV value obtained in step S301 into expression (1). In step S303, final image capture exposure parameters are determined by restricting the image capture exposure parameters obtained in step S301 using the limit value obtained in step S302, and compensating for the lack of exposure for a background, which is caused by the restriction, using a shutter speed.

For example, in the case of ISO Auto setting, assume that the image capture exposure parameters obtained in step S301 are F2.0, ISO 6400, and a shutter speed of 1/60 second. In this case, when the limit value of the ISO speed obtained in step S302 is ISO 3200, the final image capture parameters are F2.0, ISO 3200, and a shutter speed of 1/30 second.

Note that in order to make the description easy to understand, the foregoing has been described in connection with a flow in which, under the assumption of ISO Auto, the ISO speed is restricted after image capture exposure parameters have been determined once based on a fixed f-number. However, a relationship between an f-number and an ISO speed (AV value-SV value) that serve as limits can be obtained from a modification of expression (1). Therefore, final image capture exposure parameters can be calculated also by applying the relationship between the f-number and the ISO speed that serve as limits to the program diagram used in step S301.

In step S304, the exposure parameters that were determined in step S213 are displayed on the image display unit 107, similarly to steps S203, S208, S214. Here, while the image capture exposure parameters are displayed, the camera MPU 101 may instruct the lens control unit 114 to perform an automatic focus adjustment operation based on the defocus amounts output from the focus detection unit 115. In this case, although the image capture exposure parameters are changed in accordance with the "information of the distance to the in-focus position", some users could possibly find it undesirable that the displayed exposure parameters are changed in succession during the focus adjustment operation. Therefore, the display of the exposure parameters may not be updated during a one-shot AF tracking operation associated with the user's operation to turn ON the switch SW1 of the operation unit 117. Alternatively, a cycle of calculation of a limit value may be delayed compared to a computation cycle of the exposure parameters, or an update cycle of the "information of the distance to the in-focus position" used in calculation of a limit value may be delayed compared to the computation cycle of the exposure parameters.

Returning to the description of FIG. 2, when the user has performed an operation to turn ON the switch SW2 of the operation unit 117, processing proceeds to step S215. When the user's operation on the operation unit 117 is an operation to press the switch SW1 and the switch SW2 at a time, the display in step S214 may be omitted.

In step S215, the MPU 101 causes the light emission flash to emit light of a predetermined pre-light emission amount and exposes the image sensor 102 to light at the same time, and also measures a degree of influence of pre-light emission on the subject through metering in the metering unit 112. In step S216, based on the measurement result of step S215, computation is performed to determine how much light emission is to be used as a main light emission amount for the time of still image capture. Then, in step S204, still image capture is performed in which the light emission flash emits light and the image sensor 102 is exposed to light at the same time.

Note that when the flash is bounced during use (when the direction of the flash is different from the direction of an optical axis of the image capture lens), the relationship between the "guide number" and the "information of the distance to the in-focus position" is not sustained. Therefore, processing proceeds to step S207 even if the determination indicates "accurate distance information" in step S206.

Figure 4:
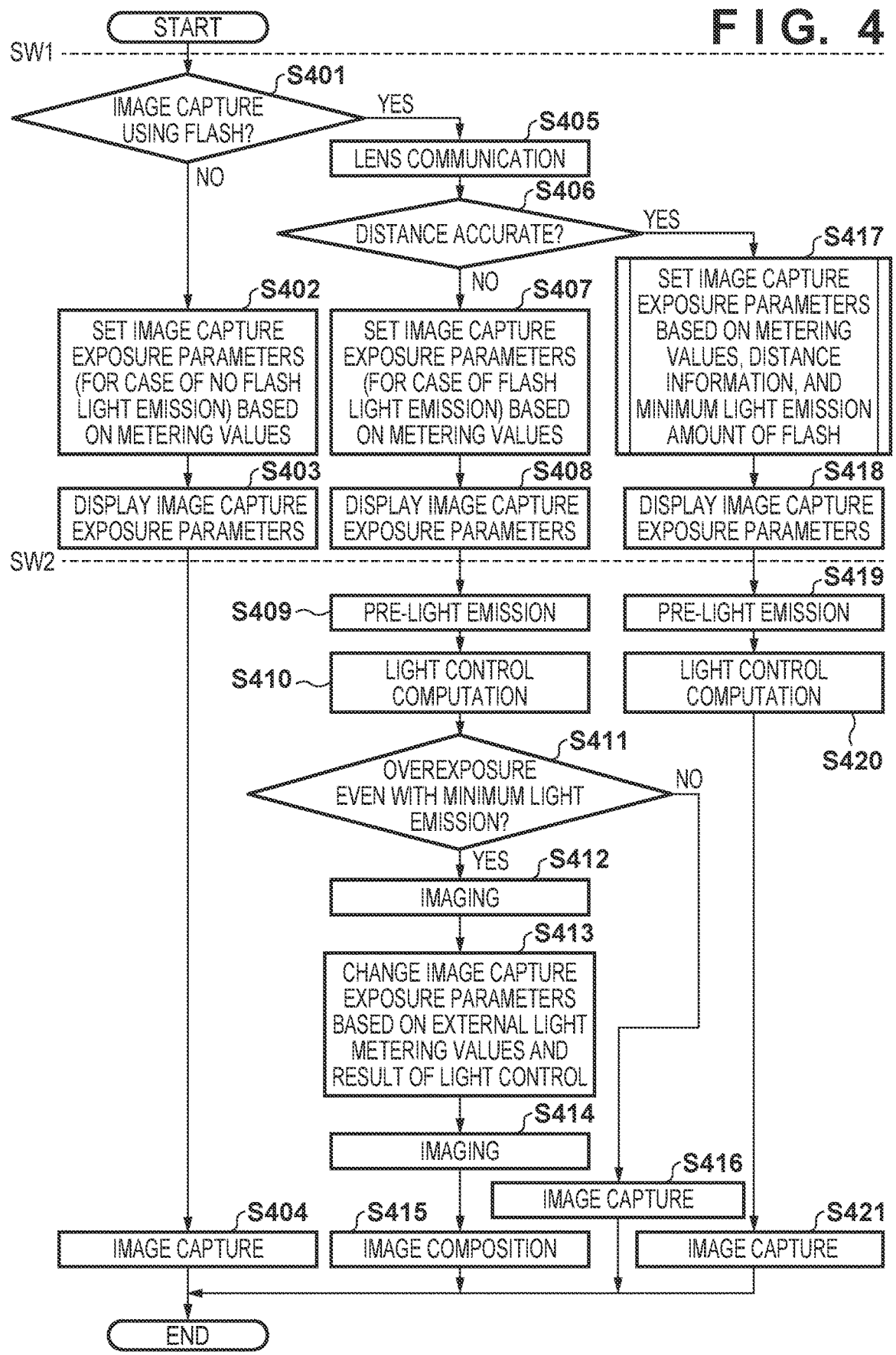
FIG. 4 is a flowchart showing an operation to switch not only exposure parameters but also an image capturing method based on lens information.

Subsequently, FIG. 4 is a flowchart showing an operation to switch not only exposure parameters but also an image capturing method based on the lens information. Steps S401, S402, S403, S404 represent the same image capture operation with no flash light emission as steps S201, S202, S203, S204 of FIG. 2. Also, step S405 is the same as step S205 of FIG. 2, and step S406 is the same as step S206 of FIG. 2. The flow of advancement to step S416 after steps S407, S408, S409, S410, S411 is the same as the flow of advancement via steps S207, S208, S209, S210, S204 of FIG. 2. Furthermore, the flow of advancement from step S406 to steps S417, S418, S419, S420, S421 is the same as the flow of advancement from step S206 to steps S213, S214, S215, S216, S204 of FIG. 2. In addition, the terms used in the description of FIG. 2, such as the "light emission flash", will be succeeded.

If it is determined in step S411 that the main light emission amount obtained in step S410 is smaller than the minimum light emission amount of the light emission flash, processing proceeds to step S412, and imaging is performed using the exposure parameters obtained in step S407 without causing the light emission flash to emit light. Here, "imaging" denotes acquisition of image data using the image sensor 102. This "imaging" is an operation that is different from an "image capture operation" in which image data that has been read out from the image sensor 102 is developed via each unit of the non-illustrated development processing system and transferred to the recording medium 109 or the wireless communication unit via the interface 108. In the operation of "imaging", an image is merely stored into a memory, and development processing and recording into the recording medium 109 are not performed.

Subsequently, processing proceeds to step S413; in step S413, which is the same as step S212 of FIG. 2, exposure parameters that do not overexpose the subject are obtained and set. Here, however, there is no execution of exposure compensation in which a shutter speed is increased in order to prevent a background region other than a main subject region from becoming dark due to the reduction in the amount of received external light caused by narrowing of the diaphragm or lowering of the ISO speed.

Subsequently, processing proceeds to step S414; the light emission flash emits light, and at the same time, imaging is performed with the image sensor 102 exposed to light using the exposure parameters set in step S413. Processing proceeds to step S415; a background region of image data obtained through the imaging in step S412 and a main subject region that is in image data obtained through the imaging in step S414 and is illuminated by light emitted by the flash are developed, composited, and transferred to the recording medium 109 or the wireless communication unit via the interface 108.

As described above, according to the foregoing embodiment, when a calculated subject distance is accurate, image capture parameters to be employed in actual image capture using a flash can be displayed upon turning ON the switch SW1.

Second Embodiment

In the above-described first embodiment, when it is determined that the main light emission amount is smaller than the minimum light emission amount of the light emission flash, exposure is adjusted so as to achieve appropriate luminance with the minimum light emission amount of the light emission flash by narrowing the diaphragm or lowering the ISO speed. In the foregoing description, in order to prevent a background region other than a main subject region from becoming dark as a result of narrowing the diaphragm or lowering the ISO speed in this exposure adjustment, exposure compensation is performed by increasing a shutter speed.

However, there is a case where exposure compensation is not performed because the actual shutter speed becomes out of alignment with a shutter speed designated by a user as a result of performing exposure compensation. In this case, a method of achieving an appropriate exposure amount for the background using a method other than exposure compensation is necessary.

In this case, although it is plausible to achieve an appropriate exposure amount for both of the main subject and the background by using a light emission instruction value that is equal to or smaller than the minimum light emission amount and is outside a controllable range, using a light emission amount that is outside the controllable range may degrade the light emission performance and cause variations in exposure for the main subject.

That is to say, using only a light emission amount within the controllable range at all times darkens the background, whereas using only a light emission amount outside the controllable range at all times causes variations in exposure for the main subject.

In view of this, the present embodiment is described in connection with a method of increasing the probability of achieving appropriate exposure for both of the main subject and the background when the required main light emission amount is smaller than the minimum light emission amount of the flash.

Note that in the present embodiment, a block configuration of the digital camera is similar to the configuration of the first embodiment shown in FIG. 1, and thus a description thereof is omitted.

Figure 5:
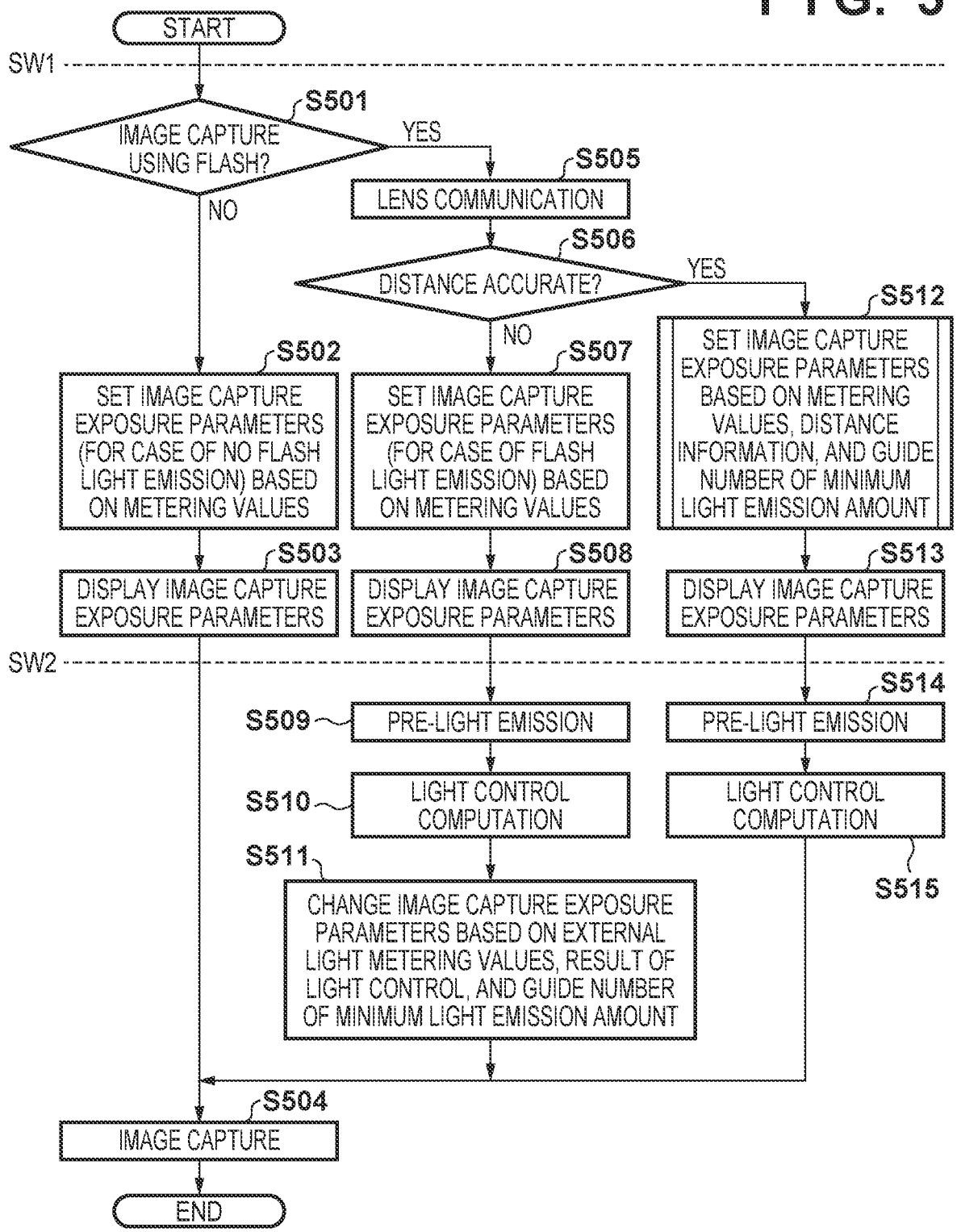
FIG. 5 is a flowchart showing an operation to determine image capture exposure parameters in a second embodiment.

FIG. 5 is a flowchart showing an operation to determine exposure parameters for the time of still image capture on the camera 100 according to the present embodiment.

In step S501, when the camera MPU 101 has accepted an input that turns ON the switch SW1 via a user's operation on the operation unit 117, whether the settings are configured to perform image capture using the built-in flash 119 or the external flash 120 is determined. Furthermore, whether they are in a state where they can emit light is also determined.

When the settings are configured to perform image capture with no light emission without using the built-in flash 119 or the external flash 120 in step S501, processing proceeds to step S502. In step S502, the camera MPU 101 determines image capture exposure parameters (AV value, TV value, ISO speed, etc.) based on the results of metering in the metering unit 112. At this time, a so-called program diagram is used with which the results of metering in the metering unit 112 are used as an input and the image capture exposure parameters are used as an output. In step S502, a program diagram for the case of no flash light emission is used.

In step S503, when the user's input that turns ON the switch SW1 of the operation unit 117 has been maintained, the camera MPU 101 displays the image capture exposure parameters that were determined in step S502 on the image display unit 107. When the user has performed an operation to turn ON the switch SW2 of the operation unit 117, processing proceeds to step S504. When the user's operation on the operation unit 117 is an operation to press the switch SW1 and the switch SW2 at a time, the display in step S503 may be omitted.

In step S504, a still image capture operation is performed, and the camera MPU 101 transfers image data that has been read out from the image sensor 102 to each unit of the non-illustrated development processing system, develops the image data, and transfers the image data to the recording medium 109 or the wireless communication unit via the interface 108.

In the case of image capture with light emission using the built-in flash 119 or the external flash 120 in step S501, processing proceeds to step S505. Here, a flash that is used in the present image capture is referred to as a "light emission flash". In step S505, the camera MPU 101 acquires lens information from the lens unit 300 via the lens control unit 114.

In step S506, the camera MPU 101 determines whether information of a distance to an in-focus position (information of a distance to a subject) included in the lens information acquired in step S505 is accurate. Whether the information of the distance to the in-focus position is accurate is determined using distance information accuracy information included in the lens information acquired in step S505, or using coincidence between a lens ID group in the ROM 130 that is referred to by the camera MPU 101 and a lens ID included in the lens information.

Note that the information of the distance to the subject may be distance information that has been obtained based on a criterion that is different from that of the information of the distance to the in-focus position. For example, it is permissible to adopt a configuration in which, based on a phase difference sensor provided with phase difference pixels (including an image sensor provided with phase difference pixels on an image capture plane), defocus amounts of the subject acquired by this phase difference sensor are converted into the information of the distance to the subject. In addition, the information of the distance to the subject may be obtained using any method as long as a common criterion is set for the information throughout the entire camera system.

If the information of the distance is determined to be inaccurate in step S506, processing proceeds to step S507. In step S507, image capture exposure parameters (AV value, TV value, ISO speed, etc.) are determined, similarly to step S502. At this time, a program diagram for the case of flash light emission is used.

In step S508, the exposure parameters that were determined in step S507 are displayed on the image display unit 107, similarly to step S503. When the user has performed an operation to turn ON the switch SW2 of the operation unit 117, processing proceeds to step S509. When the user's operation on the operation unit 117 is an operation to press the switch SW1 and the switch SW2 at a time, the display in step S508 may be omitted.

In step S509, the MPU 101 causes the light emission flash to emit light of a predetermined pre-light emission amount and exposes the image sensor 102 to light at the same time, and also measures a degree of influence of pre-light emission on the subject through metering in the metering unit 112. In step S510, based on the measurement result of step S509, calculation is performed to determine how much light emission is to be used as a main light emission amount for the time of still image capture. If the main light emission amount obtained in step S510 is smaller than the minimum light emission amount of the light emission flash, performing the still image capture using the exposure parameters as-is will produce an image that is brighter than desired brightness obtained by the MPU 101 (overexposure), even if the light emission flash emits light of the minimum light emission amount.

Figure 6:
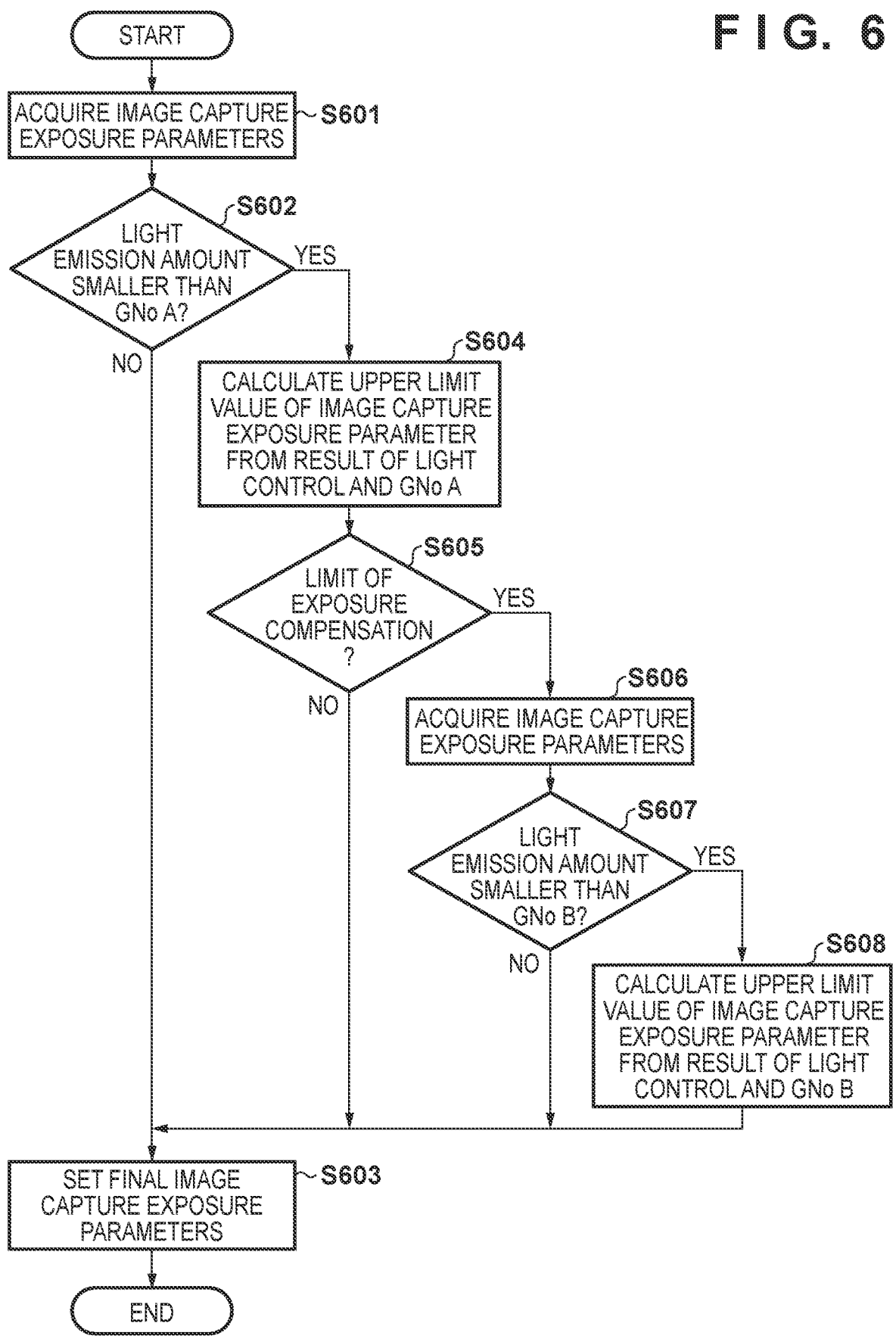
FIG. 6 is a flowchart for describing an operation of step S211 in the second embodiment.

In step S511, in order to prevent the overexposed image, the image capture exposure parameters are changed based on the result of light control computation obtained in step S510 and the minimum light emission amount. A method of changing the image capture exposure parameters in step S511 will be described using FIG. 6.

First, in step S601, the image capture exposure parameters that were obtained in step S507 are acquired. In step S602, whether the main light emission amount obtained in step S510 is smaller than GNo (guide number) A is determined. GNo A is the smallest GNo of the controllable range of the built-in flash 119 or the external flash 120. As information of GNo A, the minimum light emission amount of the built-in flash 119 is held in the ROM 130 that is referred to by the MPU 101, whereas the minimum light emission amount of the external flash 120 can be acquired by communication via the light emission control unit 118.

If the main light emission amount obtained in step S510 is equal to or larger than GNo A in step S602, the light emission amount is controllable, and image capture of the main subject region can be performed with appropriate brightness; thus, processing proceeds to step S603 without changing the image capture exposure parameters, which are set as final image capture exposure parameters. The main light emission amount obtained in step S510 is set as the main light emission amount at this time.

On the other hand, if the main light emission amount obtained in step S510 is smaller than GNo A in step S602, processing proceeds to step S604. In step S604, as an amount by which the main light emission amount obtained in step S510 falls below the minimum light emission amount (GNo A) of the light emission flash causes overexposure, computation is performed to prevent overexposure by changing the exposure parameters. Furthermore, the main light emission amount is calculated again based on the changed exposure parameters.

Specifically, the MPU 101 prevents overexposure by narrowing the diaphragm or lowering the ISO speed (including the adjustments of analog gain, digital gain, and a gamma curve). At this time, an amount of change in the diaphragm or the ISO speed is adjusted so that a region aiming for appropriate light control (main subject region) can achieve appropriate exposure with not less than the minimum light emission amount of the light emission flash in consideration of reduction in an amount of received external light caused by narrowing of the diaphragm or lowering of the ISO speed. In the present processing, although it is ideal to adjust the amount of change in the diaphragm or the ISO speed so as to achieve appropriate exposure with the minimum light emission amount, there is a case where changing the diaphragm or the ISO speed cannot fully compensate for an exposure value corresponding to overexposure attributed to the main light emission amount obtained in step S510. In this case, the amount of change in the diaphragm or the ISO speed is adjusted so as to bring the light emission amount as close as possible to the minimum light emission amount.

Furthermore, exposure compensation is performed by increasing a shutter speed in order to prevent a background region other than the main subject region from becoming dark due to the reduction in the amount of received external light caused by narrowing of the diaphragm or lowering of the ISO speed. However, as the increased shutter speed easily causes camera shake, it is plausible to set a limit on long exposure to the extent that camera shake does not occur.

Furthermore, performing image capture at a shutter speed longer than the exposure parameters that are displayed in step S508 upon turning ON the switch SW1 may bring disadvantages to the user. Therefore, the image capture exposure parameters are determined based on the settings of an image capture mode and the user settings.

In step S605, determination is made about whether the image capture exposure parameters determined in step S604, in comparison to the image capture exposure parameters obtained in step S601, have values that can compensate for the loss of exposure corresponding to the change made by narrowing the diaphragm, lowering the ISO speed, and the like by increasing the shutter speed.

If exposure compensation can be made in step S605, setting the light emission amount calculated in step S604 as the main light emission amount can achieve appropriate exposure for both of the main subject region and the background region other than the main subject region; thus, processing proceeds to step S603, and the image capture exposure parameters determined in step S604 are set as final exposure parameters. The main light emission amount obtained in step S604 is set as the main light emission amount at this time.

If exposure compensation cannot be made in step S605, it is not possible to perform image capture while achieving appropriate exposure for both of the main subject region and the background region, and thus image capture that places priority on exposure for the background region is performed. In step S606, the image capture exposure parameters that were obtained in step S507 are acquired, similarly to step S601.

Next, in step S607, whether the main light emission amount obtained in step S510 is smaller than GNo B is determined. GNo B is a guide number that represents a light emission amount slightly smaller than GNo A used in S602, and that is outside the controllable range although light emission is possible therewith.

If the main light emission amount obtained in step S510 is equal to or larger than GNo B in step S607, processing proceeds to step S603 without changing the image capture exposure parameters acquired in step S606, which are set as final image capture exposure parameters. Also, the main light emission amount obtained in step S510 is set as the main light emission amount at this time. When the required main light emission amount is equal to or larger than GNo B and smaller than GNo A, although there is a risk that the main subject may be overexposed or underexposed, priority is placed on achieving appropriate exposure for the background region without changing the diaphragm, the ISO speed, and the shutter speed from the time of turning ON the switch SW1.

If the main light emission amount obtained in step S510 is smaller than GNo B in step S607, processing proceeds to step S608. In step S608, the diaphragm is narrowed or the ISO speed is lowered by an amount by which the main light emission amount obtained in step S510 falls below GNo B, similarly to step S604. The aperture of the diaphragm or the value of the ISO speed at this time is equal to or larger than the value that was determined in step S604. Furthermore, the main light emission amount is calculated again based on the changed exposure parameters. As described above, the amount of change in the diaphragm or the ISO speed is adjusted so that the main subject region achieves appropriate exposure with not less than a light emission amount of the light emission flash with which light emission is possible but which is outside the controllable range, in consideration of the reduction in the amount of received external light caused by narrowing of the diaphragm or lowering of the ISO speed. The main light emission amount obtained in step S608 is set as the main light emission amount at this time. In this way, although there is a risk that the main subject may be overexposed or underexposed, exposure for the background is compensated. The execution of the processing shown in FIG. 6 makes it possible to reduce the change in the exposure parameters from the time of turning ON the switch SW1, as well as overexposure or underexposure of the main subject, while placing priority on achieving appropriate exposure for the background region.

As described above, in step S511 of FIG. 5, final image capture exposure parameters are determined by changing the image capture exposure parameters that were set in step S601, S604, S606, or S608 depending on conditions.

Then, in step S504 of FIG. 5, the light emission flash emits light and the image sensor 102 is exposed to light at the same time, and a still image is captured.

Figure 7:
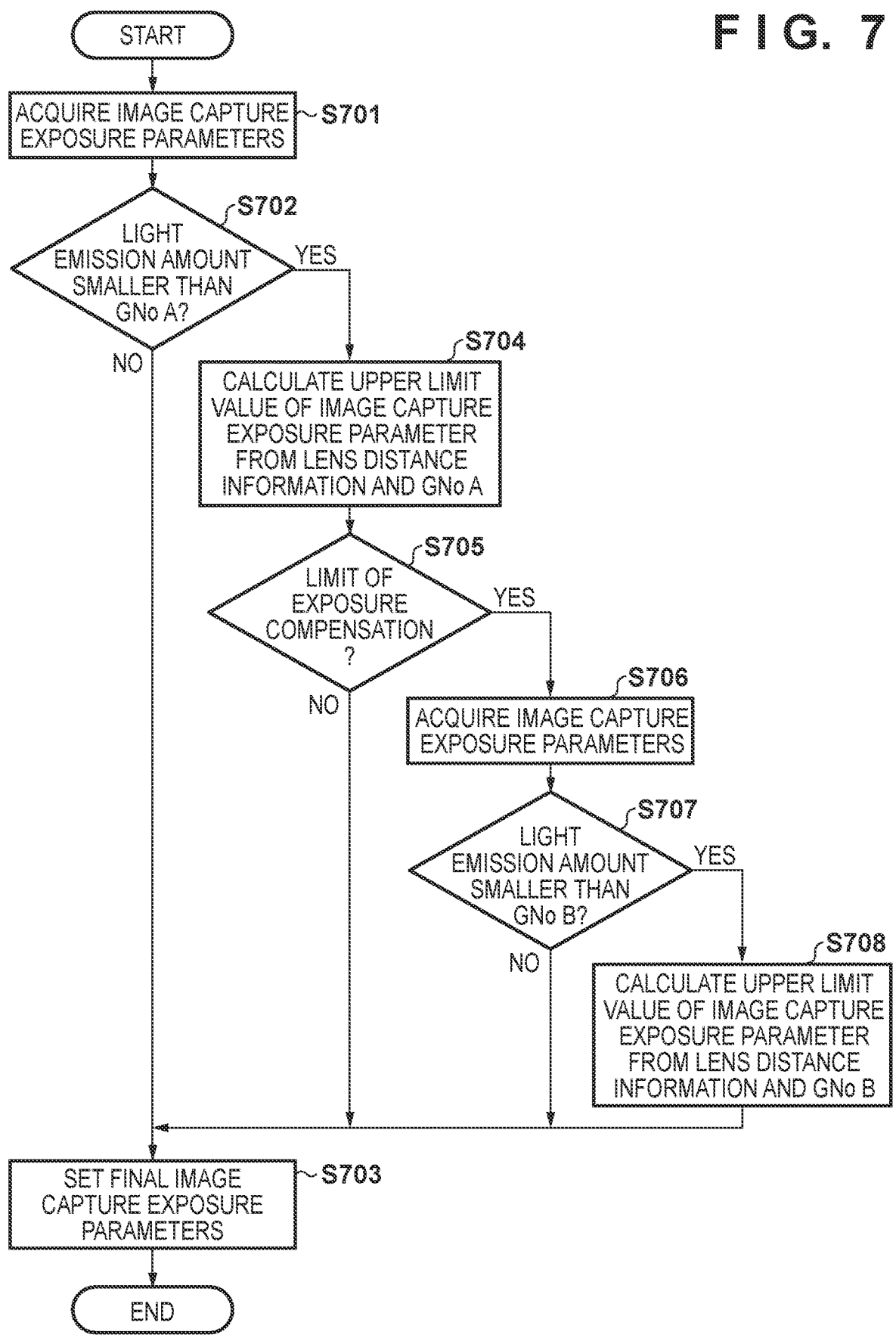
FIG. 7 is a flowchart for describing an operation of step S212 in the second embodiment.

Returning to the description of FIG. 5, if the information of the distance is determined to be accurate in step S506, processing proceeds to step S512. In step S512, image capture exposure parameters (AV value, TV value, ISO speed, etc.) are determined; this operation to determine the image capture exposure parameters will be described using a flowchart of FIG. 7. FIG. 7 shows a subroutine of the operation to determine the image capture exposure parameters in step S512 of FIG. 5.

In step S701, image capture exposure parameters (AV value, TV value, ISO speed, etc.) are determined, similarly to step S507. At this time, a program diagram for the case of flash light emission is used. Note that the processes of steps S702, S703 are similar to the processes of steps S602, S603 in FIG. 6.

In step S704, similarly to step S604, as an amount by which the main light emission amount obtained in step S510 falls below the minimum light emission amount (GNo A) of the light emission flash causes overexposure, computation is performed to prevent overexposure by changing the exposure parameters. Furthermore, the main light emission amount is calculated again based on the changed exposure parameters. However, in step S704, rather than obtaining the main light emission amount from the computation result obtained through actual pre-light emission, a limit value of the ISO speed is calculated from the information of the distance to the in-focus position, which is included in the lens information acquired in step S505, and the minimum light emission amount (GNo A) of the light emission flash. GNo A is the same as the guide number used in step S602.

$$\text{Guide number}=f\text{-number}\times\text{distance }(m)\text{ (in the case of ISO 100)} \quad (1)$$

Expression (1) is a basic expression indicating a relationship among a guide number, an image capture exposure parameter, and a distance; by using the minimum light-emission guide number and the information of the distance to the in-focus position, limit values of the f-number and the ISO speed that do not cause overexposure with the minimum light-emission guide number can be obtained.

In step S704, in the case of ISO Auto setting, a limit value of the ISO speed is obtained by assigning an f-number based on the AV value obtained in step S701 into expression (1). Also, the ISO speed included among the image capture exposure parameters obtained in step S701 is clipped with the obtained limit value. Then, final image capture exposure parameters are determined by compensating for an amount of change in the exposure parameters using the shutter speed.

Note that in order to make the description easy to understand, the foregoing has described limiting of the ISO speed after image capture exposure parameters have been determined once based on a fixed f-number, under the assumption of ISO Auto. However, a relationship between an f-number and an ISO speed (AV value-SV value) that serve as limits can be obtained from a modification of expression (1). Therefore, final image capture exposure parameters can be calculated also by applying the relationship between the f-number and the ISO speed that serve as limits to the program diagram used in step S701.

The process of step S705 thereafter is similar to the process of step S605. If the limit of exposure correction has not been reached yet, the main light emission amount obtained in step S704 is set as the main light emission amount. If the limit of exposure correction has been reached, processing proceeds to step S706; the image capture exposure parameters obtained in step S701 are acquired in step S706, and processing proceeds to step S707. The process of step S707 is similar to the process of step S607. If the main light emission amount obtained in step S510 is equal to or larger than GNo B, the main light emission amount obtained in step S510 is set as the main light emission amount.

Then, in step S708, a limit value of the ISO speed is obtained from expression (1), similarly to step S704. Furthermore, the main light emission amount is calculated again based on the changed exposure parameters. The main light emission amount obtained in step S708 is set as the main light emission amount at this time.

As described above, in step S512 of FIG. 5, final image capture exposure parameters are determined by changing the image capture exposure parameters that were set in step S701, S704, S706, or S708 depending on conditions.

Returning to the description of FIG. 5, in step S513, the exposure parameters that were determined in step S512 are displayed on the image display unit 107, similarly to steps S503, S508. Then, when the user has performed an operation to turn ON the switch SW2 of the operation unit 117, processing proceeds to step S514. When the user's operation on the operation unit 117 is an operation to press the switch SW1 and the switch SW2 at a time, the display in step S213 may be omitted.

In step S514, the MPU 101 causes the light emission flash to emit light of a predetermined pre-light emission amount and exposes the image sensor 102 to light at the same time, and also measures a degree of influence of pre-light emission on the subject through metering in the metering unit 112.

In step S515, based on the measurement result of step S514, computation is performed to determine how much light emission is to be used as a main light emission amount for the time of still image capture. Then, in step S504, a still image capture operation is performed by causing the light emission flash to emit light and exposing the image sensor 102 to light at the same time.

Note that when the flash is bounced, the relationship between the guide number and the information of the distance to the in-focus position is not sustained, and thus processing proceeds to step S507 even if the information of the distance is determined to be accurate in step S506.

As described above, in the present embodiment, exposure parameters are obtained using two light emission amounts, namely the minimum light emission amount (GNo A) within the controllable range and the light emission amount (GNo B) with which light emission is possible but which is outside the control range. This makes it possible to reduce the change in the exposure parameters from the time of turning ON the switch SW1, as well as overexposure or underexposure of the main subject, while placing priority on achieving appropriate exposure for the background region.

Third Embodiment

In the second embodiment, control is performed as follows.

An upper limit of an exposure parameter is determined using the minimum light emission amount (GNo A) within the controllable range, and exposure compensation for an amount by which the diaphragm was narrowed or the ISO speed was lowered is performed using the shutter speed. When this exposure compensation was not able to be performed, for example, a background region that is not reached by emitted light becomes dark in a captured image. To avoid this, an upper limit of an exposure parameter is determined using a light emission amount (GNo B) outside the control range, and exposure parameters are determined again. As the upper limit of the exposure parameter obtained using the light emission amount GNo B has a larger value than the upper limit of the exposure parameter obtained using the light emission amount GNo A, image capture parameters place priority on brightness of the background when GNo B is used.

In this case, the second embodiment switches between GNo A and GNo B depending on whether exposure compensation was able to be performed; however, it is plausible to switch between them in accordance with an image capture scene. In the present embodiment, which one of GNo A and GNo B is used as a light emission amount is determined in accordance with an image capture scene.

Note that in the present embodiment, a block configuration of the digital camera is similar to the configuration of the first embodiment shown in FIG. 1, and thus a description thereof is omitted. Also, an operation to determine exposure parameters for the time of still image capture in the present embodiment is the same as the flowchart of the second embodiment shown in FIG. 5. However, as the contents of the processes of steps S511, S512 differ from the second embodiment, this difference will be described.

Figure 8:
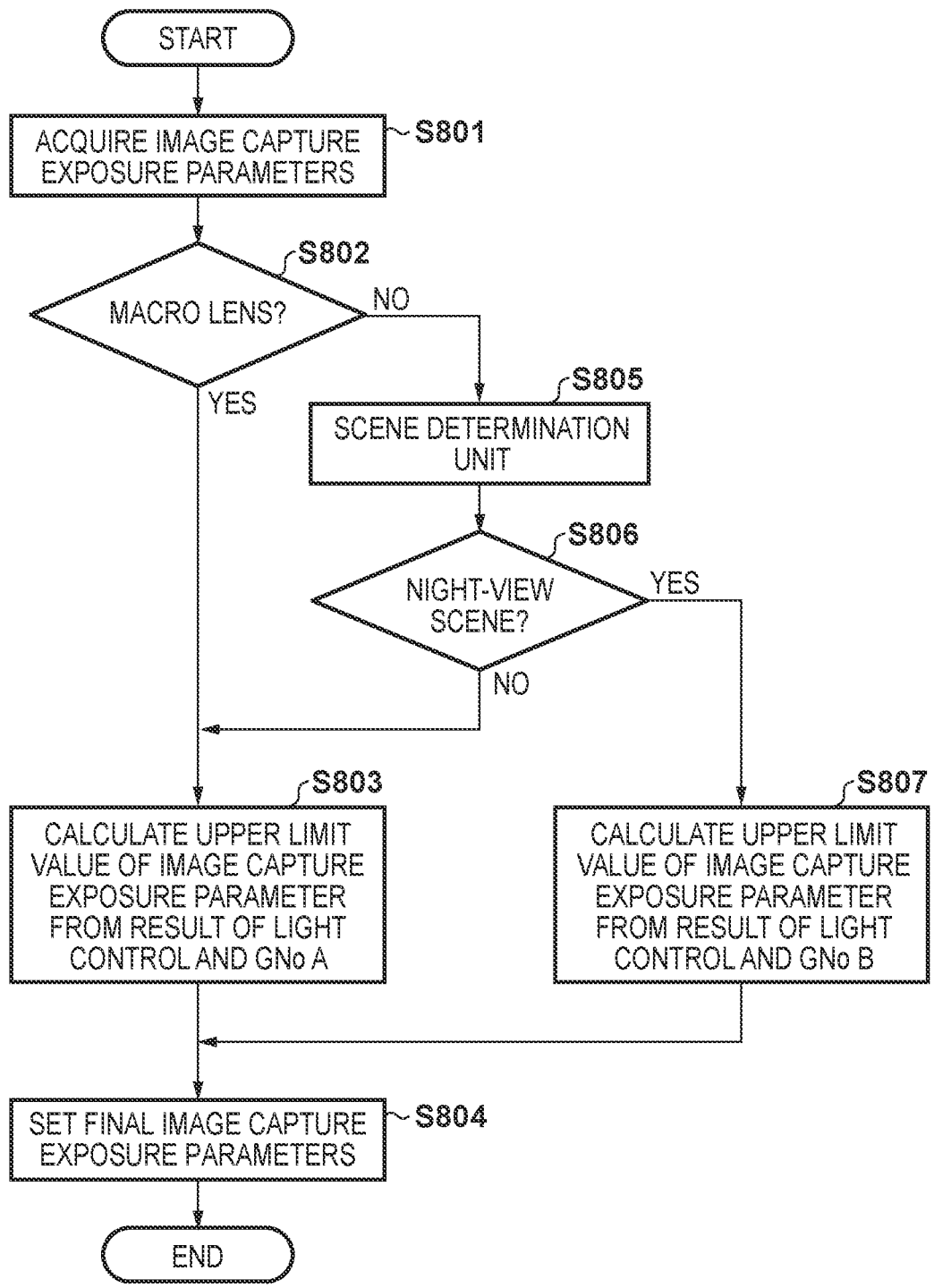
FIG. 8 is a flowchart for describing an operation of step S211 in a third embodiment.

A process performed in step S511 in the third embodiment will now be described using a flowchart of FIG. 8.

In step S801, a process that is similar to step S601 is performed. In step S802, whether a macro lens is used is determined from the result of lens communication performed in step S505. If the macro lens is used in step S802, processing proceeds to step S803. If the macro lens is used, image capture is performed mostly with respect to a subject from a close distance, and thus priority is placed on achieving appropriate exposure for the subject. Therefore, in step S803, an upper limit value of an image capture exposure parameter is determined using the minimum light emission amount (GNo A) within the controllable range, similarly to step S604, and final image capture exposure parameters are set in step S804. Furthermore, the main light emission amount is calculated again based on the determined upper limit value of the image capture exposure parameter. The light emission amount obtained in step S804 is set as the main light emission amount at this time.

If the macro lens is not used in step S802, processing proceeds to step S805, and scene determination is made. The scene determination of step S805 performs a process of detecting whether a scene is a night-view scene from the results of metering in the metering unit 112 and a histogram. In step S806, whether the scene is the night-view scene is determined using the processing result of step S805. If the scene is not determined to be a night view in step S806, processing proceeds to step S803. On the other hand, if the scene is determined to be a night view in step S806, processing proceeds to step S807 to place priority on making a background bright in image capture.

In step S807, an upper limit of an image capture exposure parameter is determined using the light emission amount (GNo B) outside the control range, similarly to step S608. The upper limit of the image capture exposure parameter obtained in step S807 is an exposure control value with which a bright photograph can be obtained compared to the upper limit of the image capture exposure parameter obtained in step S803. Furthermore, the main light emission amount is calculated again based on the determined upper limit value of the image capture exposure parameter. The light emission amount obtained in step S807 is set as the main light emission amount at this time. Thereafter, processing proceeds to step S804, and final image capture exposure parameters are determined.

As described above, in step S511, image capture exposure parameters are determined through the processes of steps S803, S807 in accordance with scene determination.

Figure 9:
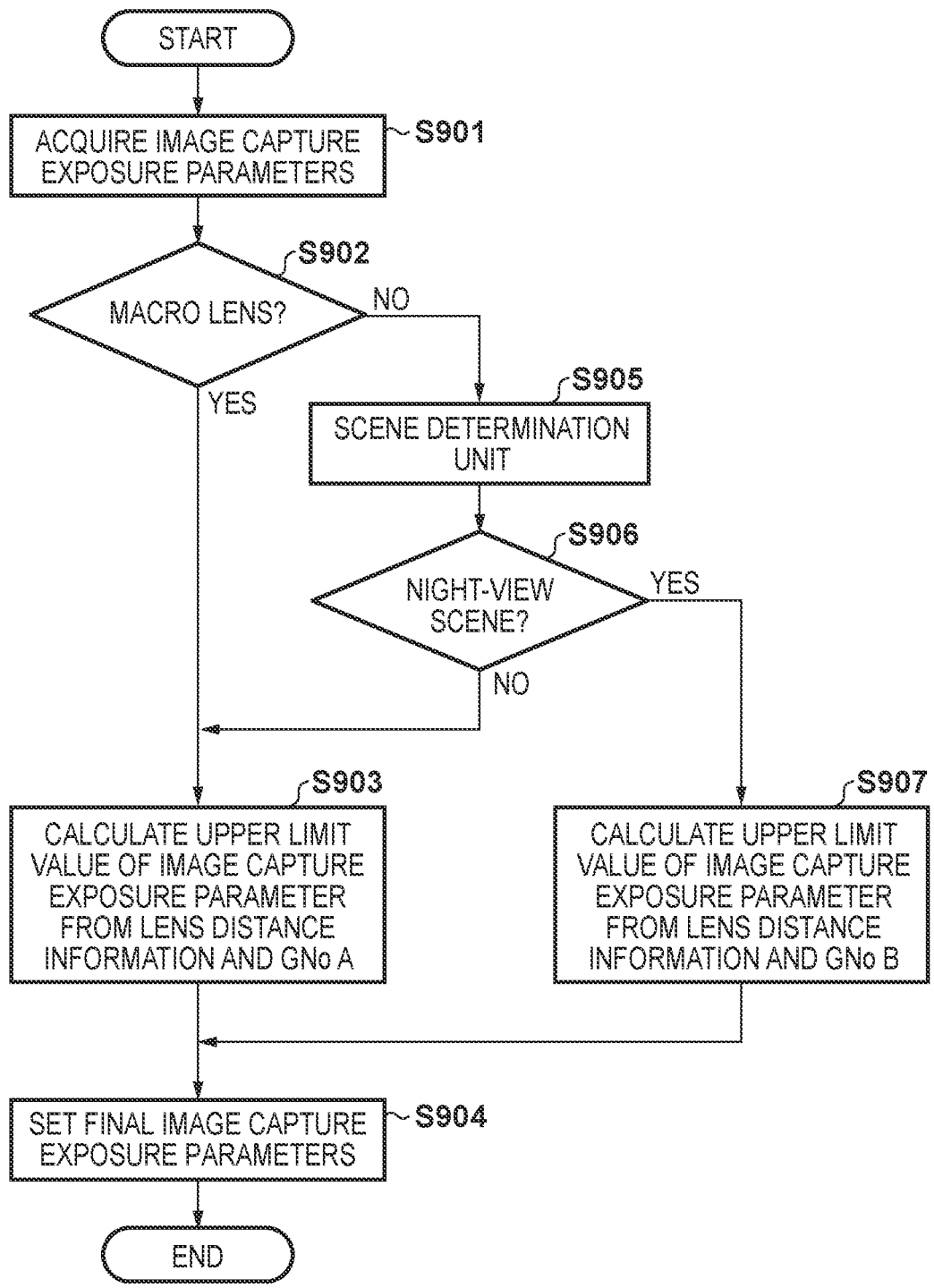
FIG. 9 is a flowchart for describing an operation of step S212 in the third embodiment.

Subsequently, the process of step S512 will be described using a flowchart of FIG. 9.

In steps S901, S902, processes that are similar to steps S801, S802 are performed. In step S903, an upper limit of an image capture exposure parameter is determined from lens distance information and GNo A, similarly to step S704. In steps S904, S905, S906, processes that are similar to steps S804, S805, S806 are performed. In step S907, an upper limit of an image capture exposure parameter is determined from lens distance information and GNo B, similarly to step S708.

As described above, in the present embodiment, when a lens being used is a macro lens, image capture exposure parameters are determined using the minimum light emission amount (GNo A) within the controllable range to place priority on subject luminance. Then, if a scene is determined to be a night-view scene, image capture exposure parameters are determined using a light emission amount (GNo B) outside the control range to place priority on night-view luminance. These processes make it possible to achieve appropriate flash illumination and background brightness in accordance with a scene.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-081313 filed Apr. 22, 2019 and Japanese Patent Application No. 2020-021880 filed Feb. 12, 2020, which are hereby incorporated by reference herein in their entirety.

What is claimed is:

1. An image capturing apparatus, comprising:
at least one processor or circuit configured to function as:
an instructing unit capable of issuing an instruction for an image capture preparation operation and an instruction for an image capture operation;
a metering unit configured to meter brightness of a subject;
a calculating unit configured to calculate values of exposure parameters for a time of image capture based on a metering result of the metering unit;
an acquiring unit configured to acquire information related to an image capture lens; and
a controlling unit configured to, when image capture is performed with light emitted by a light emitter that illuminates the subject, control the calculating unit so that a calculation method of the values of the exposure parameters at a time of issuance of the instruction for the image capture preparation operation by the instructing unit is changed based on information of accuracy of information of a distance to the subject, the information of the accuracy being included in the information related to the image capture lens,
wherein when the information of the distance is determined to be accurate using the information of the accuracy of the information of the distance, the controlling unit controls the calculating unit so as to calculate exposure parameters that do not cause overexposure based on the information of the distance and a minimum light emission amount of the light emitter at the time of issuance of the instruction for the image capture preparation operation by the instructing unit, and uses the calculated exposure parameters as exposure parameters of the time of issuance of the image capture operation.

2. The image capturing apparatus according to claim 1, wherein
when the information of the distance is determined to be inaccurate using the information of the accuracy of the information of the distance, the controlling unit controls the calculating unit so as to calculate the values of the exposure parameters based on a program diagram at the time of issuance of the instruction for the image capture preparation operation by the instructing unit, the program diagram being for a case of light-emission image capture in which image capture is performed with the light emitted by the light emitter.

3. The image capturing apparatus according to claim 2, wherein
when the image capturing apparatus has been set using the values of the exposure parameters for the case of the light-emission image capture calculated by the calculating unit, if overexposure occurs even with a minimum light emission amount of the light emitter, the controlling unit changes the exposure parameters of the time of issuance of the instruction for the image capture operation by the instructing unit to values that do not cause the overexposure.

4. The image capturing apparatus according to claim 3, wherein
when exposure for a background becomes dark as a result of changing the exposure parameters of the time of issuance of the instruction for the image capture operation by the instructing unit to the values that do not cause the overexposure, the controlling unit makes compensation to prevent darkening of the exposure for the background by changing an exposure parameter that does not influence exposure for a main subject with light emitted by the light emitter.

5. The image capturing apparatus according to claim 4, wherein
when the exposure for the background does not become appropriate even if compensation is made to prevent darkening of the exposure for the background, the controlling unit changes the exposure parameter using a light emission amount smaller than the minimum light emission amount of the light emitter.

6. The image capturing apparatus according to claim 4, wherein
when a macro lens is used as a lens of the image capturing apparatus, the controlling unit does not make compensation that prevents darkening of the exposure for the background.

7. The image capturing apparatus according to claim 4, wherein
in a case of a night-view scene, the controlling unit changes the exposure parameter using a light emission amount smaller than the minimum light emission amount of the light emitter.

8. The image capturing apparatus according to claim 1, wherein
when exposure for a background becomes dark as a result of performing image capture using the calculated exposure parameters, the controlling unit makes compensation to prevent darkening of the exposure for the background by changing an exposure parameter that does not influence exposure for a main subject with light emitted by the light emitter.

9. The image capturing apparatus according to claim 8, wherein
when the exposure for the background does not become appropriate even if compensation is made to prevent darkening of the exposure for the background, the controlling unit changes the exposure parameter using a light emission amount smaller than the minimum light emission amount of the light emitter.

10. The image capturing apparatus according to claim 8, wherein
when a macro lens is used as a lens of the image capturing apparatus, the controlling unit does not make compensation that prevents darkening of the exposure for the background.

11. The image capturing apparatus according to claim 8, wherein
in a case of a night-view scene, the controlling unit changes the exposure parameter using a light emission amount smaller than the minimum light emission amount of the light emitter.

12. The image capturing apparatus according to claim 1, wherein
the exposure parameters include at least one of an ISO speed and an f-number.

13. The image capturing apparatus according to claim 1, further comprising
a display device configured to display the values of the exposure parameters calculated by the calculating unit.

14. The image capturing apparatus according to claim 13, wherein
the display device does not display a numerical value indicating a value of a parameter which is included among the exposure parameters at the time of issuance of the instruction for the image capture preparation operation by the instructing unit, and for which there is a possibility that a value different from the exposure parameters is calculated at the time of issuance of the instruction for the image capture operation by the instructing unit.

15. The image capturing apparatus according to claim 13, wherein the at least one processor or the circuit is configured to further function as
an automatic focus adjustment unit configured to make the image capture lens focused, and
wherein when the information related to the image capture lens has changed due to an operation of the automatic focus adjustment unit in accordance with the issuance of the instruction for the image capture preparation operation by the instructing unit, the display device does not update display of the exposure parameters.

16. The image capturing apparatus according to claim 15, wherein
a cycle of updating of display of the exposure parameters by the display device is delayed compared to a cycle of updating of the information related to the image capture lens associated with an operation of the automatic focus adjustment unit after the instructing unit has issued the instruction for the image capture preparation operation.

17. The image capturing apparatus according to claim 1, wherein the at least one processor or the circuit is configured to further function as
a detecting unit configured to detect a direction of the light emitter, wherein
when the detecting unit has detected that the direction of the light emitter is different from a direction of an optical axis of the image capture lens, the controlling unit controls the calculating unit so as not to perform an operation to make different the calculation method for the values of the exposure parameters at the time of issuance of the instruction for the image capture preparation operation by the instructing unit.

18. The image capturing apparatus according to claim 1, wherein the at least one processor or the circuit is configured to further function as
a compositing unit configured to composite image data that has been acquired by performing image capture without light emitted by the light emitter, with image data that has been acquired by performing image capture with the light emitted by the light emitter.

19. The image capturing apparatus according to claim 1, wherein the accuracy of the information of the distance to the subject is determined using distance information accuracy information included in the information related to the image capture lens.

20. The image capturing apparatus according to claim 1, wherein the accuracy of the information of the distance to the subject is determined using coincidence between a lens ID stored in the image capturing apparatus and a lens ID included in the information related to the image capture lens.

21. A method of controlling an image capturing apparatus that includes at least one processor or circuit configured to function as an instructing unit capable of issuing an instruction for an image capture preparation operation and an instruction for an image capture operation, the method comprising:
metering brightness of a subject;
calculating values of exposure parameters for a time of image capture based on a metering result of the metering;
acquiring information related to an image capture lens; and when image capture is performed with light emitted by a light emitter that illuminates the subject, controlling the calculating so that a calculation method of the values of the exposure parameters at a time of issuance of the instruction for the image capture preparation operation by the instructing unit is changed based on information of accuracy of information of a distance to the subject, the information of the accuracy being included in the information related to the image capture lens, wherein in the controlling, when the information of the distance is determined to be accurate using the information of the accuracy of the information of the distance, the calculating is controlled so as to calculate exposure parameters that do not cause overexposure based on the information of the distance and a minimum light emission amount of the light emitter at the time of issuance of the instruction for the image capture preparation operation by the instructing unit, and the calculated exposure parameters are used as exposure parameters of the time of issuance of the image capture operation.

22. A non-transitory computer-readable storage medium storing a program for causing a computer to execute each step of a method for controlling an image capturing apparatus that includes at least one processor or circuit configured to function as an instructing unit capable of issuing an instruction for an image capture preparation operation and an instruction for an image capture operation, the method comprising:

metering brightness of a subject;

calculating values of exposure parameters for a time of image capture based on a metering result of the metering;

acquiring information related to an image capture lens; and when image capture is performed with light emitted by a light emitter that illuminates the subject, controlling the calculating so that a calculation method of the values of the exposure parameters at a time of issuance of the instruction for the image capture preparation operation by the instructing unit is changed based on information of accuracy of information of a distance to the subject, the information of the accuracy being included in the information related to the image capture lens, wherein in the controlling, when the information of the distance is determined to be accurate using the information of the accuracy of the information of the distance, the calculating is controlled so as to calculate exposure parameters that do not cause overexposure based on the information of the distance and a minimum light emission amount of the light emitter at the time of issuance of the instruction for the image capture preparation operation by the instructing unit, and the calculated exposure parameters are used as exposure parameters of the time of issuance of the image capture operation.

* * * * *